United States Patent [19]

Matthews

[11] Patent Number: 5,564,875
[45] Date of Patent: Oct. 15, 1996

[54] LOCKING FASTENER

[76] Inventor: Norman L. Matthews, Level R, 1 Havelock St., West Perth 6005, Australia

[21] Appl. No.: 379,588

[22] PCT Filed: Aug. 6, 1993

[86] PCT No.: PCT/AU93/00404

§ 371 Date: Feb. 6, 1995

§ 102(e) Date: Feb. 6, 1995

[87] PCT Pub. No.: WO94/03736

PCT Pub. Date: Feb. 17, 1994

[30] Foreign Application Priority Data

Aug. 6, 1992 [AU] Australia .................................. PL3972

[51] Int. Cl.$^6$ .............................. F16B 37/00; F16B 39/24
[52] U.S. Cl. .......................... 411/428; 411/149; 411/432; 411/534
[58] Field of Search ..................................... 411/149, 150, 411/205–208, 428, 432, 533, 534, 956

[56]  References Cited

U.S. PATENT DOCUMENTS

| 679,935 | 8/1901 | Behler | 411/205 X |
|---|---|---|---|
| 3,263,727 | 8/1966 | Herpolsheimer | 411/149 X |
| 3,926,237 | 12/1975 | Enders . | |
| 4,134,438 | 1/1979 | Frieberg et al. . | |
| 4,433,578 | 2/1984 | Hill | 411/534 x |
| 4,619,559 | 10/1986 | Norris | 411/428 X |
| 4,704,058 | 11/1987 | Crunwell | 411/149 X |
| 4,969,788 | 11/1990 | Goiny | 411/428 |
| 5,080,545 | 1/1992 | McKinlay . | |
| 5,190,423 | 3/1993 | Ewing | 411/149 X |
| 5,203,656 | 4/1993 | McKinlay . | |

FOREIGN PATENT DOCUMENTS 1026339  4/1953  France .

*Primary Examiner*—Neill R. Wilson
*Attorney, Agent, or Firm*—Nixon & Vanderhye

[57] ABSTRACT

A locking fastener (10) comprises a nut (12) having a threaded portion (14) formed about a central axis (16) of the fastener. A head portion (18) of the nut is formed integral to the threaded portion (14), for gripping the fastener during tightening or loosening. An inner member (22) is provided coaxial with the head portion (18) and is designed to be mechanically coupled to an underside of the head portion (18) so as to be substantially immobile relative to the head portion. Inner member (22) is provided with inclined cam means (24) in the form of a plurality of cam surfaces arranged in an annular configuration about the inner member (22). A locking member (26) is provided coaxial with the threaded portion (14) and has a matching cam means (28) on one face adapted to rotatably interengage in facing relation with the inclined cam means (24) on inner member (22). A first pressure transmitting surface (30) on the opposite face of the locking member (26) is rotatably received in facing relation to a second pressure transmitting surface (34) provided on an outer member (32). Outer member (32) is coaxial with the locking member (26). A solid friction reducing material in the form of an annulus (36) is located between the first pressure transmitting surface (30) of the locking member (26) and the second pressure transmitting surface (34) of the outer member (32). Locking means for releasably locking the locking member (26) in position relative to the outer member (32) are also provided. In use, the outer member (32) can be held stationary relative to a fastened object so that the friction reducing annulus (36) can act as a bearing for the head portion (18) during tightening or loosening of the fastener and when the fastener has been tightened and the locking member has been locked in position relative to the outer member (32), inadvertent loosening of the head portion (18) due to vibration can be inhibited by the interengaging cam means (24, 28).

10 Claims, 4 Drawing Sheets

LOCKING FASTENER

FIELD OF THE INVENTION

The present invention relates to a locking fastener and relates more particularly to a threaded fastener of this type, having friction reducing means, for reducing friction during tightening and loosening of the fastener, in combination with cam means for inhibiting inadvertent loosening of the fastener due to vibration.

The invention will be described with particular reference to threaded wheel fasteners, such as nuts and bolts, however it will be understood that the locking fastener of the invention can be used in any application where the fastener may be subjected to vibrational or oscillatory loads.

A conventional fastener, such as a wheel nut or bolt comprises a head portion with grip means designed to receive a wheel brace or spanner or fastening machine, a threaded portion to screw onto the thread of a wheel stud or onto the inner flange located on the wheel axle, and a tapered cone portion shaped to engage in a matching recess provided in the wheel. In some arrangements the cone portion is provided separate from the head portion and sometimes the fastener is further provided with a conventional washer behind the cone. In other arrangements, particularly on truck wheels the wheel nuts or bolts have a flat under-surface rather than a cone portion.

Irrespective of the form of the wheel fastener a primary objective during tightening is to pre-load the bolt or wheel stud to the particular tension specified so as to give the desired clamping effect. When a conventional wheel fastener is tightened a high degree Of friction is encountered, comprising friction on the threaded portion, friction on the wheel recess and friction on the cone portion or underside of the fastener contacting the wheel surface or recess. Thus a significant proportion of the torque required to tighten a conventional wheel nut or bolt is expended in overcoming the frictional resistance, whilst the remainder provides the pre-load or clamping pressure. These torque losses due to friction become very significant on heavy vehicles where the torque required to overcome friction and attain clamping pressure is very high. Fastener friction therefore causes wasteful expenditure of energy during both tightening and loosening as is well known. Furthermore, fastener friction also causes inaccurate reading of the torque tension setting during pre-loading of the fastener. In practice it is extremely difficult to distinguish the torque required to overcome friction, (especially underhead friction, where with different fasteners and repeated use the friction varies), from the torque required to attain the necessary pre-load, and this can lead to the wheel not being securely clamped to the wheel flange and therefore more susceptible to loosening. Attempts have been made to overcome the problems of high friction, but have been of limited success.

The problem of conventional wheel fasteners tending to loosen when subjected to vibrational or cyclic loading is significant, particularly on heavy transport vehicles where catastrophic failure resulting in loss of a wheel can cause substantial damage and even loss of life. A loosening force may arise during elongation or compression of the associated threaded stud or bolt when subjected to a working load, that results from a component of the pre-load force on the fastener being directed along the lead angle or helix of the thread series in a loosening direction. A working load that exceeds the pre-load can cause the fastener to rotate in a loosening direction. A number of locking devices designed to overcome this problem are known in the art, one of which comprises a two part lock washer having opposing cam surfaces.

Such a prior art lock washer arrangement is disclosed, for example, in U.S. Pat. No. 3,263,727 by Arthur B. Herpolsheimer. This U.S. Pat. discloses a pair of lock washers received, for example, on a stud or lug between a nut and the object to be fastened. As the nut is tightened, the washer adjacent the nut becomes fixed to the nut due to the frictional contact resistance with the surface of the nut. The other washer also becomes substantially immobile relative to the surface of the object to be fastened. The friction surfaces on the lock washers are typically provided with teeth or protrusions to enhance the fictional contact resistance. When the fastener is subjected to vibrational or cyclic loading and the nut attempts to rotate in a loosening direction the cam surfaces of the interengaging lock washers are designed to redirect the loosening forces in a tightening direction. Thus the nut and its associated lock washer are forced to "climb" the inclined cam surfaces of the interengaging washer that is fixed relative to the object to be fastened, thereby compensating for the loss in clamping pressure and preventing further loosening of the nut.

One of the problems encountered with such prior art lock washers is providing a satisfactory means for intentionally loosening the fastener with it's associated lock washer(s) without damaging or breaking the fastener. In U.S. Pat. No. 3,263,727 the lock washer components are so designed that whilst the interengaged cam surfaces counteract loosening forces on an associated threaded fastener, the cam surfaces may be over-ridden upon the application of intentional loosening force to the fastener, without exceeding the elastic limit of the fastener. In another prior art arrangement the lock washer is provided with hexagon flats and must be turned back and then Gripped together with the nut to effect loosening. In either case the fastener is still subjected to the same frictional forces noted above, as well as frictional resistance between the Interengaging cam surfaces and between the associated lock washer(s) and the object to be fastened and/or the fastener. Thus it is still difficult to effect accurate pre-loading of the fastener during tightening, and during loosening it can be even more difficult to remove the fastener than with a conventional fastener absent the lock washer(s). A further problem with lock washers such as those disclosed in U.S. Pat. No. 3,263,727, is that they can only be safely used a limited number of times, since the frictional contact resistance on the friction surfaces tends to decrease with repeated use as the teeth or protrusions are worn away.

SUMMARY OF THE INVENTION

The present invention was developed with a view to providing an improved locking fastener which combines the benefits of a friction reducing means with the self-locking effect achievable using interengaging cam means.

According to the present invention there is provided a locking fastener comprising in combination:
- a threaded portion formed about a central axis of the fastener;
- a head portion provided integral to the threaded portion for gripping the fastener during tightening or loosening about said central axis;
- an inclined cam means provided in connection with said head portion so as to be substantially immobile relative to the head portion in use;

a locking member coaxial with said threaded portion and having a matching cam means on one face and a first pressure transmitting surface on an opposite face, said matching cam means being adapted to rotatably interengage in facing relation with said inclined cam means;

an outer member coaxial with said locking member and having a second pressure transmitting surface adapted to rotatably receive said first pressure transmitting surface of the locking member in facing relation thereto;

a solid friction reducing material provided to reduce friction between said locking member and said outer member; and, a locking means for releasably locking said locking member in position relative to said outer member, whereby, in use, said outer member can be held stationary relative to a fastened object so that said friction reducing material can act as a low friction bearing for the head portion during tightening or loosening of the fastener and wherein, when the fastener has been tightened and said locking member has been locked in position relative to said outer member, inadvertent loosening of said head portion due to vibration can be inhibited by the interengaging cam means.

Preferably said inclined cam means is provided on an inner member which is coaxial with and mechanically coupled to an underside of the head portion so as to be substantially immobile relative to the head portion, said locking member being rotatably supported between said inner and outer members. However, said inclined cam means can also be provided integral to said head portion of the fastener on an undersurface of the head portion.

Typically said solid friction reducing material is in the form of a separate annulus located between said plain pressure transmitting surface of the locking member and said first pressure transmitting surface of the outer member, and is manufactured of plastics material having a low coefficient of sliding friction. Advantageously said outer member has an annular recess provided therein within which said annulus of friction reducing material is contained.

In a preferred embodiment said inclined cam means comprises a plurality of cam surfaces arranged in an annular configuration, each cam surface being inclined in a circumferential direction with an angle of inclination which is steeper than the lead angle or helix of a thread series of the threaded portion. The matching cam means of the locking member typically comprises a plurality of matching cam surfaces arranged in an annular configuration on said one face of the locking member, each of the matching cam surfaces being inclined in the same circumferential direction and with the same angle of inclination as the cam surfaces of said inclined cam means. All of the cam surfaces rise in a counter-clockwise direction, ie. in a loosening direction. Therefore, if the fastener is subjected to a vibrational load so that the threaded portion is caused to rotate in a loosening direction, the head portion with the inner member connected thereto must "climb" the cam surfaces of the locking member causing a wedging effect, thereby increasing the pro-load on the thread and inhibiting further loosening of the fastener.

In order to facilitate a better appreciation of the nature of the invention together with further objects and advantages thereof, several embodiments of the locking fastener will now be described, by way of example only, with reference to the accompanying drawings in which:

DETAILED DESCRIPTION OF PREFERRED EMBODIMENTS

Figure 1:
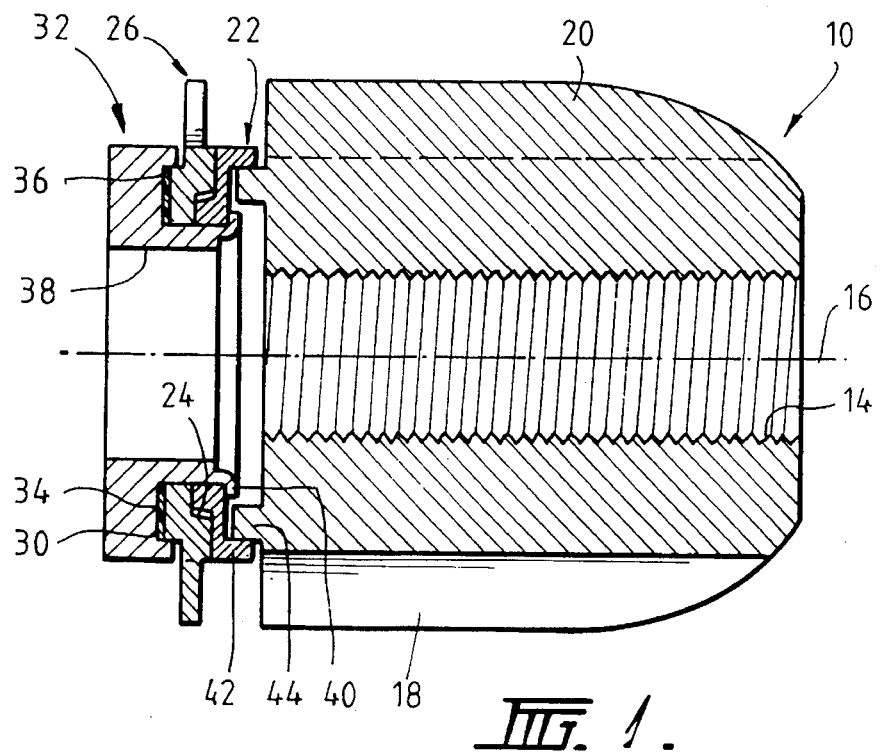
FIG. 1 is a section view of a first embodiment of the locking fastener according to the invention, shown in an assembled condition.

FIGS. 1, 2, 5 and 7 illustrate a first embodiment of the locking fastener 10 according to the invention, which comprises a nut 12 having a threaded portion 14 formed about a central axis 16 of the fastener. A head portion 18 of the nut is formed integral to the threaded portion 14, for gripping the fastener during tightening or loosening about the central axis 16. The outer periphery 20 of the nut may be provided with grip means in the form of gear teeth or splines, or may be a plurality of flats arranged as in a conventional hexagon nut. In this embodiment the nut 12 has a toothed outer periphery as can be seen most clearly in FiG. 7. An inner member 22 is provided coaxial with said head portion 18 and is designed to be mechanically coupled to an underside of the head portion 18 so as to be substantially immobile relative to the head portion. Inner member 22 is in the form of a ring and is provided with inclined cam means 24. The inclined cam means 24 of this embodiment comprises a plurality of cam surfaces arranged in an annular configuration about the inner ring member 22. Each cam surface is inclined in a circumferential direction with an angle of inclination which is steeper than the lead angle or helix of the thread series of the threaded portion 14.

Figure 2:
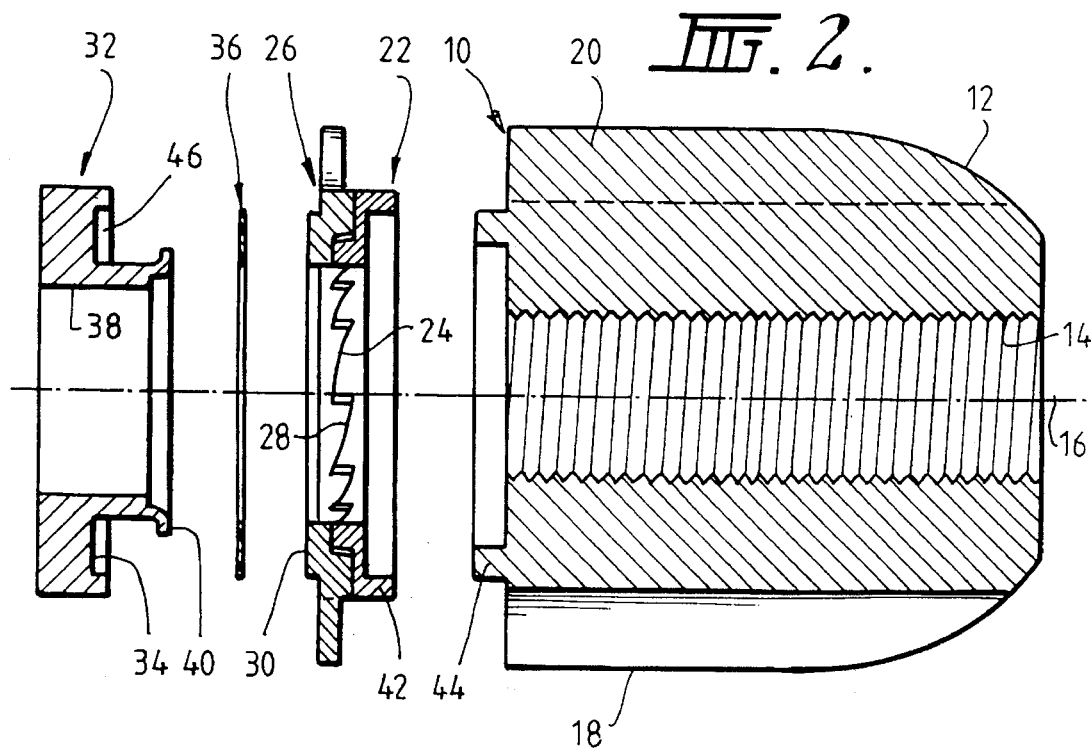
FIG. 2 is a section view of the locking fastener of FIG. 1 shown in a disassembled condition.

The locking fastener 10 further comprises a locking member 26 coaxial with the threaded portion 14 and having a matching cam means 28 on one face and a first pressure transmitting surface 30 on the opposite face. The first pressure transmitting surface 30 is provided with a smooth, hardened surface. The matching cam means 28 is adapted to rotatably interengage in facing relation with the inclined cam means 24 on inner member 22 as illustrated in FIG. 2. The matching cam means 28 is similar to the inclined cam means 24 and comprises a plurality of matching cam surfaces arranged in an annular configuration on said one face of the locking member 26, each of the matching cam surfaces being inclined in the same circumferential direction and with the same angle of inclination as the cam surfaces of the inclined cam means 24.

The locking fastener further comprises an outer member 32 coaxial with the locking member 26 and having a second pressure transmitting surface 34 adapted to rotatably receive the first pressure transmitting surface 30 of the locking member 26 in facing relation thereto. A solid friction reducing material is provided to reduce friction between the locking member 26 and the outer member 32. In this embodiment the friction reducing material is in the form of a separate annulus 36 located between the first pressure transmitting surface 30 of the locking member 26 and the second pressure transmitting surface 34 of the outer member 32. Typically the annulus of friction reducing material is manufactured of plastics material having a low coefficient of sliding friction, for example nylon or a fluoropolymer such as PTFE. Advantageously a composite of materials including a plastics material such as one of the foregoing together with a filler such as powdered glass or metal, in order to produce a solid friction reducing material having a minimum coefficient of friction and capable of withstanding a large compressive force. The most preferred form of the solid friction reducing material is teflon or a composite incorporating teflon.

The outer member 32 of this embodiment is formed with a boss 38 with an outwardly flared end 40 which rotatably retains the outer member 32 in connection with the locking member 26 and inner member 22. Prior to assembly of the locking fastener 10 the locking member 26 and inner member 22 are rotatably received on the boss 38 of the outer member 32, with the annulus 36 located between the locking member and the outer member. Then the inner member 22 is fixed to the underside of the nut 12, so that the outer member 32, the locking member 26 and the annulus 36 are the only components of the assembly which are able to rotate with respect to the nut 12 (when the nut is unloaded). In this embodiment the inner member 22 is formed with a cylindrical wall portion 42 having an inside diameter designed to press fit against the outside diameter of an annular protrusion 44 provided on the underside of the nut 12. The inner member 22 is forced onto the annular protrusion 44 in a tight friction fit and in addition to substantially immobilizing the inner member 22 relative to the head portion 18 of the nut 12, this arrangement also helps to correctly align all of the components of the assembly coaxially with central axis 16.

The outer member 32 is formed with an annular recess, the base of which forms the second pressure transmitting surface 34. Annular recess 46 contains the annulus of friction reducing material 36 and is designed to prevent the material from spreading or deteriorating under high compressive loads. Preferably the first pressure transmitting surface 30 provided on locking member 26 is formed on an annular protrusion having inside and outside diameter dimensions within a few micrometers of the outside and inside diameter dimensions respectively of annular recess 46, so that cold flow of the friction reducing material 36 can be substantially eliminated or kept to a minimum. This annular protrusion also helps to keep the parts of the fastener closely aligned. If desired, the first pressure transmitting surface 30 may be provided with an inner and/or outer circumferential lip to define a containment zone within which the friction reducing material 36 can be even more effectively contained. Such an arrangement is disclosed in commonly-owned Australian Provisional Patent Application No. PL8763.

In use, the threaded portion 14 of nut 12 may, for example, be screwed onto the thread of a stud or lug provided on the wheel flange (not shown) of a vehicle. As the nut 12 is rotated onto the wheel stud the outer member 32 will engage with the wheel flange, and as the clamping pressure increases will eventually remain stationary relative to the wheel flange due to frictional contact between the outer surface of the outer member 32 facing the wheel flange and the material of the wheel flange. The outer surface of outer member 32 may be provided with teeth or other protrusions to increase the frictional resistance with the surface of the wheel flange. This may be necessary to ensure that the frictional resistance between the outer member 32 and the wheel flange exceeds the frictional resistance between the interengaging cam surfaces of the locking member 26 and inner member 22.

Since the inclined cam surfaces on the inner member 22 and locking member 26 rise in a counter-clockwise direction, ie., in the loosening direction, during tightening the axially directed surfaces between the cam surfaces on the inner member 22 engage with the axially directed surfaces between the cam surfaces on the locking member 26 to cause the locking member 26 to turn with inner member 22 as a unit. Conversely, during loosening the locking member 26 will turn the inner member 22 when the locking member 26 is rotated in the counter-clockwise direction, ie., in the loosening direction, due to interengaging of the respective cam surfaces.

As the tightening force is continued to be applied to the head portion 18 of the nut 12 the annulus 36 of friction reducing material acts as a bearing for the head portion 18, (via inner member 22 and locking member 26), so that most of the torque applied to the fastener is converted to a hold-down or clamping pressure that pro-loads the associated wheel stud or bolt.

Preferably, when the required pro-load has been attained the fastening tool is removed and typically means for releasably locking the locking member 26 to the outer member 32 is provided, (not shown in FIGS. 1, 2, 5 or 7), so that the locking member 26 can be substantially immobilized relative to the outer member 32 and is therefore also held stationary relative to the fastened object by the outer member 32. The friction reducing annulus 36 is thereby temporarily rendered inoperable as a low friction bearing. Therefore, if the wheel nut 12 is subjected to a vibrational or cyclic load so that the threaded portion 14 is caused to rotate in a loosening direction, the head portion 18 with the inner member 22 connected thereto must move up the incline of the cam surfaces of the interengaging locking member 26, producing a wedging or locking effect and thereby increasing the clamping pressure and effectively redirecting the loosening forces in a tightening direction.

The cam surfaces on the locking member 26 and inner member 22 therefore operate in a similar manner to that of prior art lock washers. However, the presence of annulus 36 of friction reducing material substantially eliminates the sliding friction that would be normally present using known lock washers with a conventional fastener. Thus, during both tightening and loosening significantly less torque can be applied to the head portion 18 of the locking fastener 10 to attain the same pre-load. Furthermore, whereas with a conventional fastener with lock washer arrangement it may prove extremely difficult to loosen the fastener due to the interengaging cam surfaces of the lock washers, with the locking fastener 10 of the present embodiment the locking member 26 together with inner member 22 and nut 12 can be released relatively easily due to the presence of the friction reducing material between the locking member 26 and outer member 32. It is not necessary to realign the top half of the fastener with the bottom half to effect loosening, as in prior art hexagon nut type locking fasteners. It is thus relatively easy to turn locking member 26 back (in a counter-clockwise direction), after the means for locking the locking member 26 to outer member 32 has been released, due to the presence of the friction reducing material 36. Hence the wedging or locking effect can be readily released with the locking fastener according to the invention, without any risk of damaging the fastener or the stud.

Figure 3:
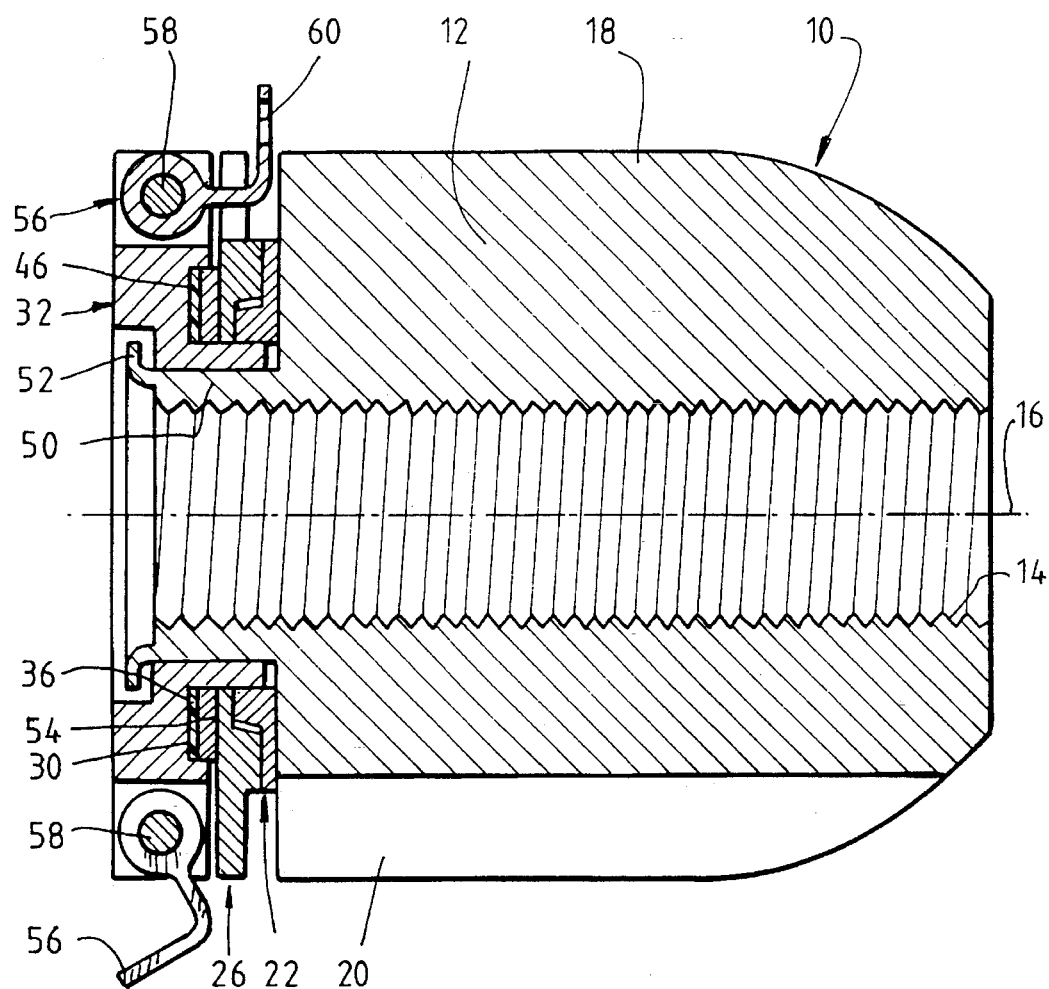
FIG. 3 is a part-section view of a second embodiment of the locking fastener according to the invention.

FIG. 3 illustrates in part-section view a second embodiment of a locking fastener 10 according to the invention, in which the same reference numerals are used to indicate like parts to that of FIG. 1 and 2. In this embodiment the inner member 22, locking member 26 and outer member 32 are all rotatably supported on a boss extension 50 protruding from the underside of the nut 12 and having an outwardly flared end 52 to retain the assembly on the fastener. In this embodiment the inner member 22 is not fixed by a press fit to the underside of the nut 12, but simply relies on contact friction between the facing surfaces of the inner member 22 and underside of nut 12 to ensure that the inclined cam means on inner member 22 remain substantially immobile relative to the head portion 18 in use. Furthermore, in this embodiment the plain pressure transmitting surface 30 provided on the locking member 26 is not formed on an annular protrusion as in the embodiment of FIG. 1 and 2, Instead, a ring member 54 is provided which is rotatably received within the annular recess 46 in outer member 32 to sandwich the annulus 36 of friction reducing material contained therein. The ring member 54 is provided with second and third pressure transmitting surfaces on its respective sides for transmitting a clamping pressure from the plain pressure transmitting surface 30 of locking member 26 via the annulus 36 and outer member 32 to the object to be fastened. In other respects the friction reducing means and cam means of the embodiment illustrated in FIG. 3 function in a substantially identical manner to that of the embodiment of FIGS. 1 and 2.

The locking fastener 10 of FIG. 3 incorporates locking means in the form of a pair of locking clips 56 which are pivotally connected to outer member 32 at pivot points 58. Pivot points 58 are formed using lugs integral to the outer member 32 and a pivot pin to form the pivotal connection. The locking clips 56 can pivot from an unlocked position as illustrated by the lower clip in FIG. 3, and a locked position as illustrated by the upper clip in FIG. 3. In its locked position, each clip 56 engages with the outer periphery of locking member 26 no lock the latter in position relative to the outer member 32.

Although not evident in FIG. 3, the clips 56 are pivotally connected to the pivot points 58 in such a manner as to cause the clips to be biased towards the locked position. This may be achieved, for example, by manufacturing the clips from spring steel. Thus while relatively little force is required to move the clips from the unlocked position to the locked position, substantial leverage is required to return the clips from the locked position to the unlocked position. For this purpose, the clips 56 are provided with an aperture 60 in which a screw driver or other suitable lever can be inserted to provide additional leverage when releasing the locking clips to the unlocked position. A special tool, (not illustrated), may be provided which slides over the fastener and engages both clips simultaneously to exert an outwardly directed force which releases both clips from the locked position to the unlocked position automatically.

Locking member 26 is provided with a plurality of indentations along its outer periphery so that it can be locked in position by the locking clips 56 when the head portion 12 has been rotated sufficiently by the applied torque to achieve the required clamping pressure. Preferably, the outer periphery of the locking member 26 is a toothed outer periphery, similar to that of the locking member illustrated in FIG. 6. Hence, when the locking clips 56 are moved to their locked position they are received between the teeth on the outer periphery of the locking member 26, The locking clips 56 also have a small degree of lateral flex as may be needed to ensure that the locking clips are properly received between the teeth on the outer periphery of the locking member 26. The pivotal connections of the locking clips 56 to outer member 32 are designed to give rigidity and strength to resist lateral turning forces, but are relatively easy to pivot between the locked and the unlocked position.

Figure 4:
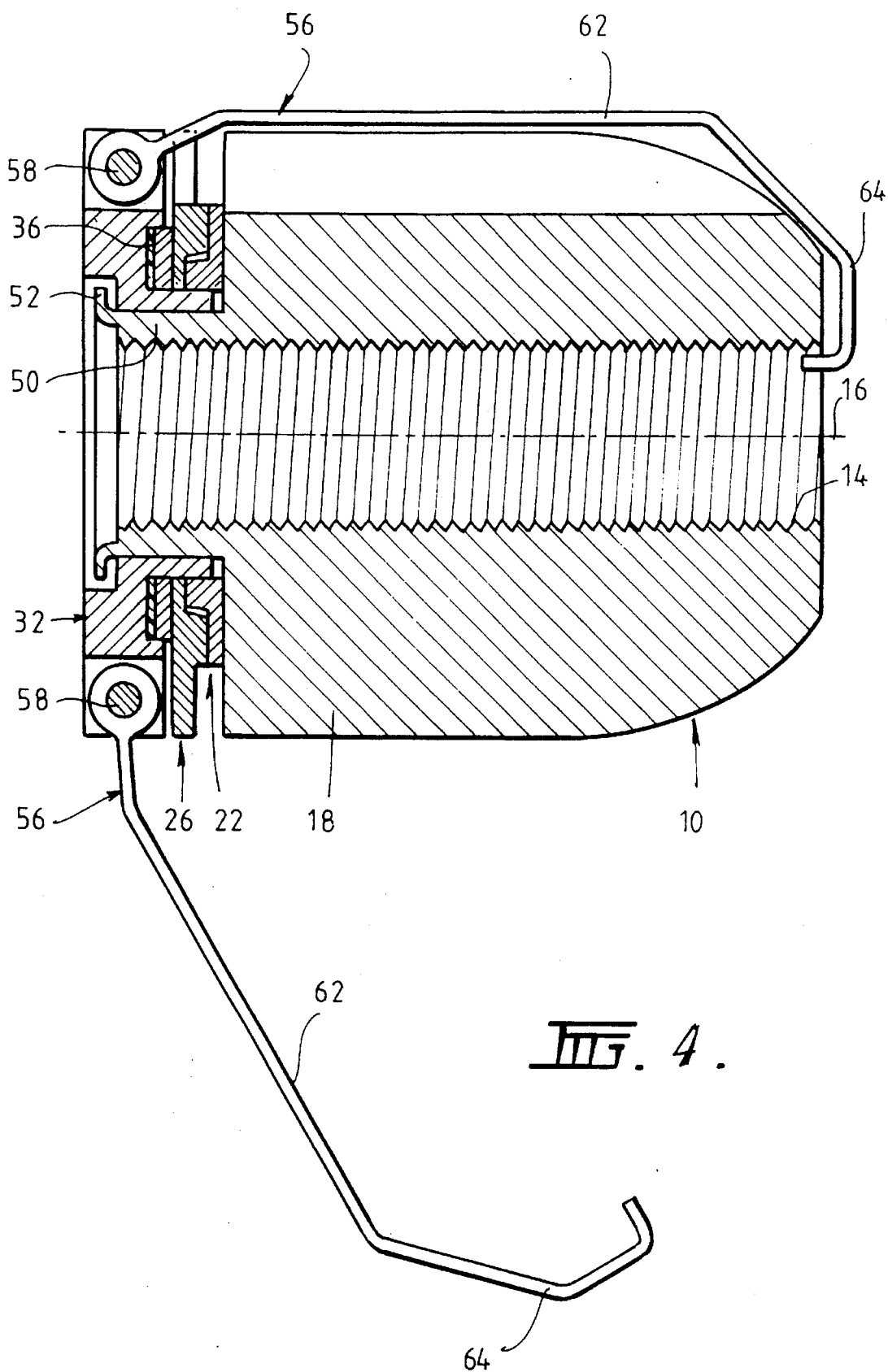
FIG. 4 is a variation of the embodiment illustrated in FIG. 3.
Figure 5:
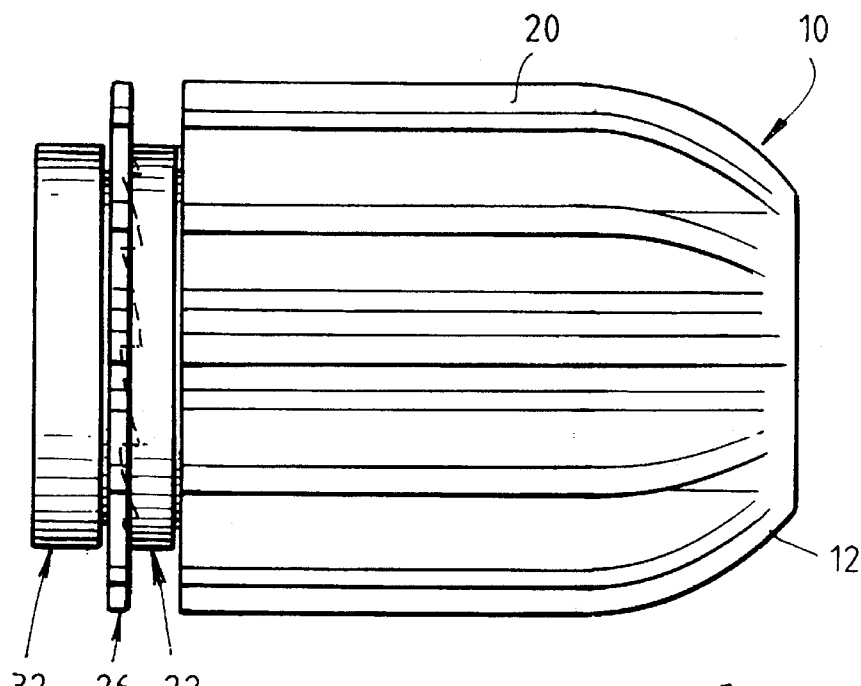
FIG. 5 is a side view of the locking fastener of FIG. 1.

The locking fastener 10 illustrated in FIG. 4 is substantially identical to the fastener illustrated in FIG. 3 except that the locking clips 56 have been modified by the provision of extension fingers 62 which extend longitudinally along the sides of the head portion of the fastener and terminate at an elbow section 64 designed to clip onto the upper surface of the nut 12. The locking clips 56 of the fastener illustrated in FIG. 4 function in a substantially identical manner to that of FIG. 3 to lock the locking member 26 in position so that it is substantially immobilized relative to the outer member 32. One advantage of the extension fingers 62 is that they provide a more easily visible indication to the operator of the presence of the clips which must be released prior to loosening of the fastener. The operator is unable to engage a tool on the head portion of the fastener without first releasing the locking clips from their locked position to their unlocked position.

The elbow section 64 of the extension fingers 62 of locking clips 56 in the embodiment of FIG. 4 have a hook portion which is received in the central bore of the nut 12 comprising the threaded portion 14 of the nut. Advantageously the upper surface of the nut 12 (or it could be a bolt) is provided with a circular groove (not shown) within which the free ends if the extension fingers 62 are received, rather than in the central bore of the nut. In addition, radially extending slots may be provided on the upper face of the nut in order to clip the free ends into the circular groove, The number of slots is preferably equal to half the number of cam surfaces on the cam means 28. The slots can provide the user with an indication that the nut has turned on the cam means during a working load, due to a change in position of the slots relative to the locking clips.

Figure 6:
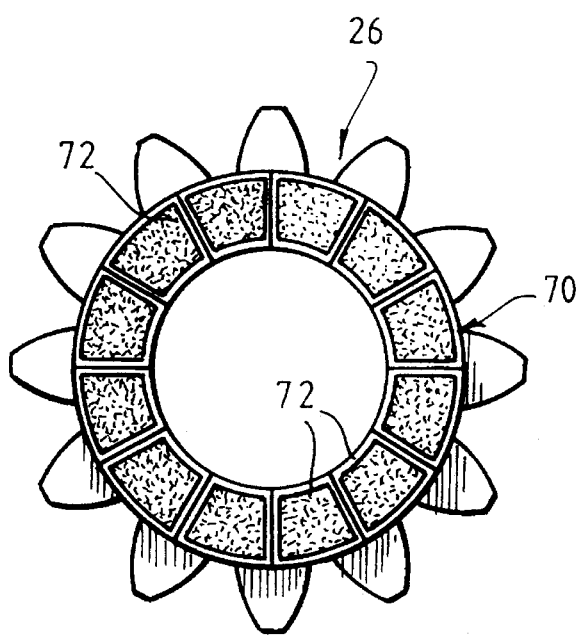
FIG. 6 is a plan view of an alternative embodiment of a locking member that could be employed in the fasteners of FIGS. 3 and 4.
Figure 7:
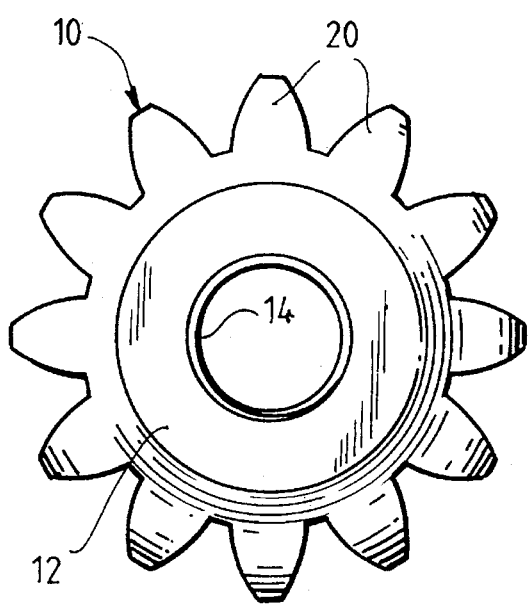
FIG. 7 is a plan view of the fastener illustrated in FIG. 5.

FIG. 6 illustrates an alternative embodiment of locking member 26 that could be employed in the fasteners of FIGS. 1, 3 or 4. In this embodiment each of the cam surfaces arranged circumferentially on the upper surface of the locking member 26 is provided with a pad 70 of friction reducing material, similar to the material employed between the outer member 32 and the underside of locking member 26. Each of the cam surfaces is bounded by a peripheral wall 72 which contains the pad 70 of friction reducing material therein. Preferably the matching cam surfaces on inner member 22 are of smooth non-corrosive material, such as by manufacturing the inner member 22 of stainless steel, for bearing against the pad 70 to minimize friction between the interengaging cam surfaces in use. By minimizing the friction between the interengaging cam surfaces the-cam locking effect is enhanced in use and loosening of the locking fastener can also be simplified.

Now that several embodiments of the locking fastener according to the invention have been described in detail, it will be apparent that the described locking fasteners have significant advantages over conventional fasteners. The provision of friction reducing mean greatly reduces the friction encountered during fastening so that a significantly greater proportion of the torque applied to the fastener is translated into clamping pressure during preloading of the fastener. Tests indicate that at least a fifty percent reduction in the torque required to preload the fastener can be achieved, compared to conventional fasteners. Furthermore, combining the friction reducing feature with the locking cam means provides the additional benefit of security against inadvertent loosening due to vibrational or cyclic loading in use. The two features in fact achieve a synergistic effect in that the friction reducing means greatly simplifies the release of the locking cam means. In a conventional lock washer arrangement the interengaging cam surfaces must first be reversed or overridden to release the clamping or wedging effect before the fastener can be loosened. However, with the locking fastener of the present invention the fastener can easily be removed even while the interengaging cam surfaces remain in their locked position. Indeed, either the grip surface of the nut (or bolt) and/or the outer periphery of locking member 26 can be engaged by a fastening tool to loosen the locking fastener. It is not necessary to release the locking cam means prior to loosening of the fastener. However, if preferred, the locking cam means can be released prior to releasing the locking clips, and then the fastener can be loosened easily in a conventional manner. If desired, the locking member 26 can be engaged and turned in a fastener loosening direction to loosen the fastener, and in doing so also releases the wedging or locking effect created by the interengaging cam surfaces. The locking member 26 "catches up" with the head portion of the fastener and Further loosening is then unimpeded by the locking effect. The fastening tool may be designed to fit loosely over the head portion of the fastener so as to accommodate the outer periphery of the locking member even if the locking member is misaligned.

It will be apparent that numerous modifications and variations can be made to the illustrated embodiments, in addition to those already described, without departing from the basic inventive concepts. For example, although in each of the illustrated embodiments the inclined cam means are provided on a separate inner member 22, such inclined cam means can also be provided on the underside of the nut 12. Thus the underside of the nut 12 would be provided with an annular configuration of cam surfaces designed to interengage with matching cam surfaces provided on the locking member 26, Furthermore, although in each of the illustrated embodiments the locking cam means and friction reducing means are provided as an assembly which is mechanically coupled to the head portion of the fastener, it will be obvious that each of the outer member, locking member and inner member may be provided as separate components which are assembled prior to use. Although the fastener illustrated in each of the embodiments is a nut, obviously a bolt can be substituted and would function in a substantially identical manner. All such variations and modifications are to be considered within the scope of the present invention the nature of which is to be determined from the foregoing description and the appended claims.

I claim:

1. A locking fastener comprising in combination:

a threaded portion formed about a central axis of the fastener;

a head portion provided integral to the threaded portion for gripping the fastener during tightening or loosening about said central axis;

an inclined cam means provided in connection with said head portion so as to be substantially immobile relative to the head portion in use;

a locking member coaxial with said threaded portion and having a matching cam means on one face and a first pressure transmitting surface on an opposite face, said matching cam means being adapted to rotatably interengage in facing relation with said inclined cam means;

an outer member coaxial with said locking member and having a second pressure transmitting surface adapted to rotatably receive said first pressure transmitting surface of the locking member in facing relation thereto;

a solid friction reducing material provided to reduce friction between said locking member and said outer member; and, a locking means for releasably locking said locking member in position relative to said outer member, whereby, in use, said outer member can be held stationary relative to a fastened object so that said friction reducing material can act as a low friction bearing for the head portion during tightening or loosening of the fastener and wherein, when the fastener has been tightened and said locking member has been locked in position relative to said outer member, inadvertent loosening of said head portion due to vibration can be inhibited by the interengaging cam means.

2. A locking fastener as claimed in claim 1, wherein said inclined cam means is provided on an inner member which is coaxial with and mechanically coupled to an underside of the head portion so as to be substantially immobile relative to the head portion, said locking member being rotatably supported between said inner and outer members.

3. A locking fastener as claimed in claim 2, wherein said inclined cam means comprises a plurality of cam surfaces arranged in an annular configuration, each cam surface being inclined in a circumferential direction with an angle of inclination which is steeper than the lead angle or helix of a thread series of the threaded portion.

4. A locking fastener as claimed in claim 3, wherein the matching cam means of the locking member comprises a plurality of matching cam surfaces arranged in an annular configuration on said one face of the locking member, each of the matching cam surfaces being inclined in the same circumferential direction and with the same angle of inclination as the cam surfaces of said inclined cam means.

5. A locking fastener as claimed in claim 4, wherein all of the cam surfaces rise in a counter-clockwise direction whereby, in use, if the fastener is subjected to a vibrational load so that the threaded portion is caused to rotate in a loosening direction, the head portion with the inner member connected thereto must "climb" the cam surfaces of the locking member causing a wedging effect, thereby increasing the clamping pressure and inhibiting further loosening of the fastener.

6. A locking fastener as claimed in claim 1, wherein said solid friction reducing material is in the form of a separate annulus located between said plain pressure transmitting surface of the locking member and said first pressure transmitting surface of the outer member, and is manufactured of plastics material having a low coefficient of sliding friction.

7. A locking fastener as claimed in claim 6, wherein said outer member has an annular recess provided therein within which said annulus of friction reducing material is contained.

8. A locking fastener as claimed in claim 7, wherein said plastics material is a PTFE, such as Teflon.

9. A locking fastener as claimed in claim 1, wherein said locking means in the form of a locking clip for releasably locking said locking member in position relative to said outer member whereby, in use, said locking member can also be held stationary relative to the fastened object.

10. A locking fastener as claimed in claim 9, wherein said locking clip is pivotally connected to said outer member and is adapted to engage an outer periphery of the locking member to lock the lather in position relative to the outer member.

* * * * *